United States Patent [19]

Kung

[11] Patent Number: 5,630,330
[45] Date of Patent: May 20, 1997

[54] LOCK FOR DISKETTE DRIVE

[75] Inventor: Ching-hu Kung, Taipae, Taiwan

[73] Assignee: Tigerex Enterprise Co., Ltd., Taipei, Taiwan

[21] Appl. No.: 661,750

[22] Filed: Jun. 11, 1996

[51] Int. Cl.[6] ............................... E05B 73/00
[52] U.S. Cl. .................. 70/58; 360/137; 70/387; 70/14
[58] Field of Search ...................... 70/14, 58, 57, 70/163, 387, 405; 360/137

[56] References Cited

U.S. PATENT DOCUMENTS

| | | | |
|---|---|---|---|
| 4,685,312 | 8/1987 | Lakoski et al. | 70/58 |
| 4,790,160 | 12/1988 | Chateau | 70/387 |
| 4,794,587 | 12/1988 | Cordiano | 70/14 |
| 5,117,661 | 6/1992 | Carl et al. | 70/163 |
| 5,136,862 | 8/1992 | Langen | 70/14 |
| 5,268,809 | 12/1993 | Eschenburg | 70/14 |
| 5,305,621 | 4/1994 | Broadwater | 360/137 |
| 5,355,272 | 10/1994 | Kung | 70/58 |
| 5,381,684 | 1/1995 | Kawamura | 70/58 |

FOREIGN PATENT DOCUMENTS

| | | | |
|---|---|---|---|
| 0384164 | 8/1990 | European Pat. Off. | 70/58 |
| 0458721 | 11/1991 | European Pat. Off. | 70/58 |
| 2240423 | 7/1991 | United Kingdom | 70/58 |

*Primary Examiner*—Darnell M. Boucher
*Attorney, Agent, or Firm*—Bacon & Thomas

[57] ABSTRACT

Disclosed is a lock for diskette drive suitable for inserting into and locking up a disk slot of said diskette drive to prevent any unauthorized data reading, writing, and copying, mainly including a top and a bottom covers closed together to contain a springy plate and a push plate therebetween. The push plate is disposed below the springy plate and is always pushed backward by a first compression spring. The bottom cover has a back recess into which a lock body is positioned. A spindle extends through the lock body for a plurality of lock pins to hang thereon. Front ends of the lock pins project through holes on the lock body to extend into a sliding groove formed on a movable member when a key card is inserted into a card slot on the lock body. The movable member is positioned between the bottom cover and the lock body and over the lock body and is always pushed by a second compression spring to an outward position and has a projection provided to one side thereof. When the key card is inserted into the card slot and the push plate is pushed into the top and the bottom covers with a dent thereof engaging with the projection of the movable member, and then the key card is pulled out, the push plate is locked in place and lift a front hook portion of the springy plate to contact with an inner edge of the disk slot and be retained therein. When the key card is inserted into the card slot again and the movable member is pushed laterally inward, the projection of the movable member disengages from the dent of the push plate, allowing the latter to move backward and the front hook portion of the springy plate to lower down and disconnect from the disk slot.

1 Claim, 8 Drawing Sheets

LOCK FOR DISKETTE DRIVE

BACKGROUND OF THE INVENTION

1. Field of the Invention

The present invention relates to a lock for diskette drive mainly including a top cover, a bottom cover, and a springy plate and a push plate disposed between the top and the bottom covers. When a key card is inserted into a card slot and the push plate is pushed inward, the springy plate is lifted to engage with and be retained by the diskette drive, and a projection on a movable member is engaged into a dent formed on the push plate to retain the latter in a locked position. The bottom cover has a back recess to receive a lock body therein. When the key card is inserted into the card slot while the push plate is in the locked position, and the movable member is laterally pushed inward, the projection of the movable member disengages from the dent on the push plate, allowing the push plate to move back and the springy plate to lower down to disengage from the diskette drive.

2. Description of the Prior Art

For most of the diskette drives connected to a computer for a diskette to read data from the computer, there is not any security measure to protect such data from being read without authorization. Any user can simply insert a floppy into the drive. The drive might very possibly be damaged due to improper operation of the drive, and the stored data are arbitarily retrieved and copied without authorization. This has long been a confusion to both the manufacturers and the consumers.

Figure 1:
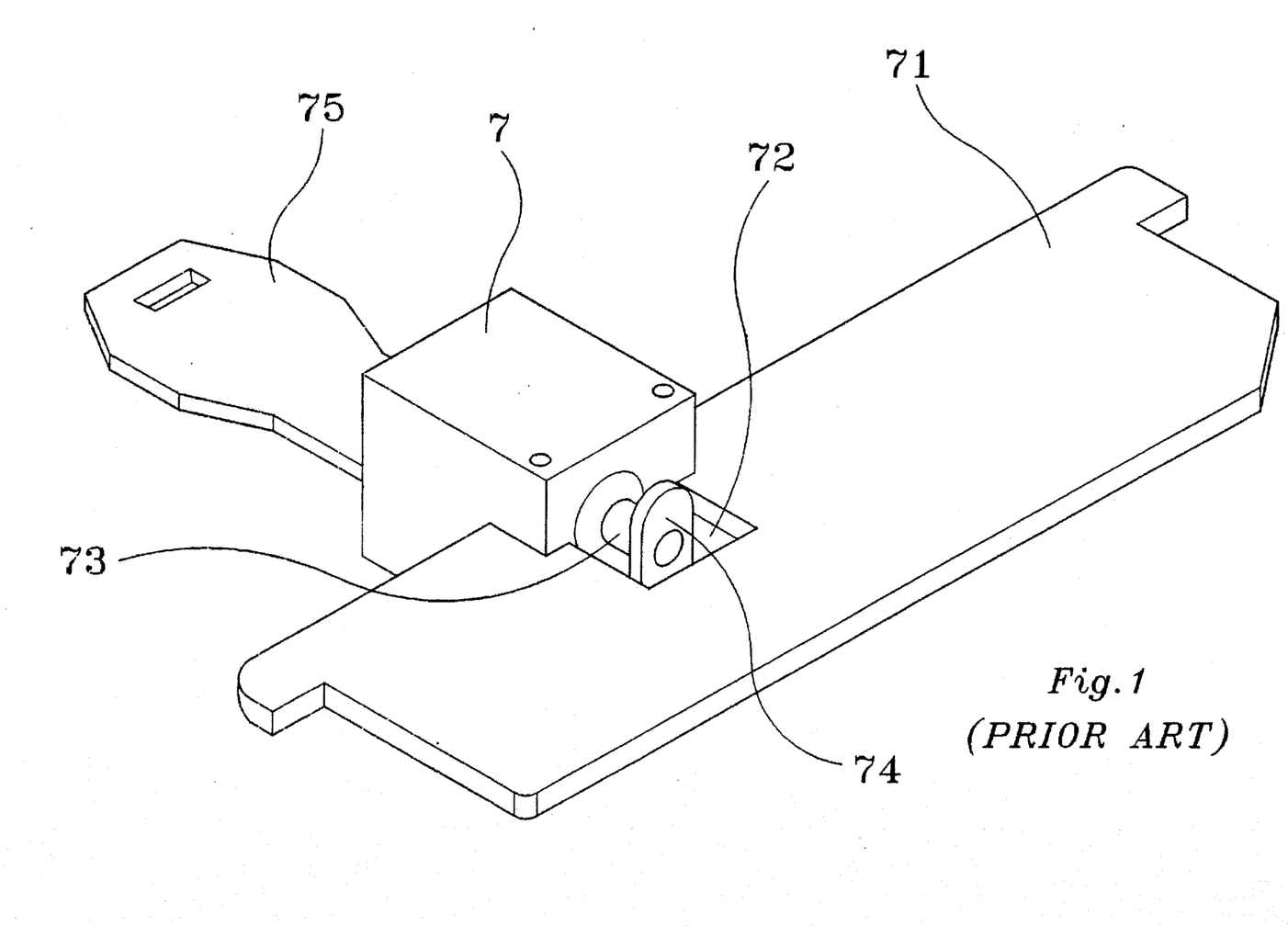
FIG. 1 is a perspective showing a conventional lock for diskette drive.

The presently available locks for diskette drives are very rough in their structure. FIG. 1 illustrates a conventional locking means for diskette drive. The locking means mainly includes a lock 7 which has an insertion plate 71 connected to a front of it. The insertion plate 71 has a thickness suitable for inserting into the front slot of a disk drive. A notch 72 of suitable dimensions is formed on the insertion plate 71 between it and the lock 7, so that a shaft 73 extending forward from the lock 7 may extend into the notch 72 and causes a rectangular end plate 74 connected to a front end of the shaft 73 to turn. When a key 75 inserted in the lock 7 is turned, the shaft 73 and accordingly, the end plate 74 are turned along with the key 75. The end plate 74 may be in a horizontal or unlocked position or in a vertical or locked position. When the end plate 74 is turned to the vertical or locked position as shown in FIG. 1, its upper and lower ends will be retained by an upper and a lower inner surface of the insertion slot of the diskette drive. Thereby, the insertion slot of the diskette drive is closed by the lock 7 and no diskette can be inserted into the drive for any read or write operation. On the other hand, when the end plate 74 is turned to the horizontal or unlocked position, the insertion plate 71 along the whole lock 7 can be pulled out of the drive from the slot, leaving the slot open and allowing a diskette to be inserted thereinto.

The major disadvantage existed in such conventional lock for diskette drive is that the rectangular end plate 74 in the vertical or locked position provides only very weak locking structure and function. When the lock 7 is pulled outward by tools, the normally metal made end plate 74 would usually destroy the edges of the disk slot which is usually made of plastic material and finally be entirely pulled out and loses its security function. A diskette can still be inserted into the slot even the latter has been damaged at its upper and lower edges and data can still be read from or written into the diskette inserted into the slot.

It is therefore desirable to develop a lock for diskette drive to provide enhanced structure and performance.

SUMMARY OF THE INVENTION

A primary object of the present invention is to provide a lock for diskette drive which may securely lock the diskette drive to prevent others from using, damaging or copying data stored in the computer.

Another object of the present invention is to provide a lock for diskette drive which is simple in structure and easy to operate.

The lock for diskette drive according to the present invention includes a notched top cover and a notched bottom cover engaged with each other to contain a springy plate therebetween to lock a diskette drive. A push plate is disposed below the springy plate. By means of compression springs and a movable member having a projection, the push plate can be forced to push the springy plate to a lifted position to lock the diskette drive. A lock body is disposed to a back portion of the bottom cover. The lock body has a card slot for a key card to insert thereinto. The lock body is provided therein with a plurality of lock pins which each includes a hook portion and a lug portion. When a key card having through holes is inserted into the lock body via the card slot and then be withdrawn therefrom, the lug portions of the lock pins shall cause front ends of the lock pins to be located in a sliding groove of the movable member, so that the movable member may be depressed to bring its projection to disengage from a dent of the push plate and thereby unlock the diskette drive, or, the push plate may be depressed to bring its dent to engage with the projection of the movable member and thereby lock the diskette drive.

BRIEF DESCRIPTION OF THE DRAWINGS

The technical means adopted by the present invention and the features and functions thereof can be best understood by referring to the following detailed description of the preferred embodiment and the accompanying drawings, wherein.

DETAILED DESCRIPTION OF THE PREFERRED EMBODIMENT

Please refer to FIGS. 2, 2A, 3, 4, and 5. The present invention is a lock for diskette drive and mainly includes a top cover 1 and a bottom cover 2 which can be closed together to form a complete body. Notches 101 and 201 are respectively formed on the top cover 1 and the bottom cover 2 at a front central portion thereof. A curved springy plate 13 is disposed between the top cover 1 and the bottom cover 2 by engaging its rear through holes 131 with fixing pins 11 provided on an inner side of the top cover 1 near the notch, such that a front hook portion of the springy plate 13 projects forward from the notches 101, 201. When the springy plate 13 is pivotally lifted, the hook portion shall hook against an inner edge of a disk slot of a diskette drive 6 (not shown). The top cover 1 further has a pair of rails 10 provided on the inner side thereof for a push plate 14 to move forward or backward therebetween. A boss 12 is centered between the rails 10. The push plate 14 has an opening 141 formed at a front central portion thereof. The opening 141 has a widened front portion for the fixing pins 11 to upward project therefrom and a narrowed rear portion for receiving a first compression spring 24 therein. The push plate 14 further has a dent 142 formed at one side near a rear end thereof. One end of the first compression spring 24 presses against the boss 12 and the other end against a central channel 21 of the bottom cover 2, which will be described below. The push plate 14 is located below the springy plate 13. When the push plate 14 is pushed to move forward between the rails 10, a front end of the push plate 14 shall lift the front hook portion of the springy plate 13. And, when the push plate 14 is pushed by the first compression spring 24 to move backward between the rails 10, the front hook portion of the springy plate 13 is allowed to lower. The first compression spring 24 shall enable the push plate 14 to normally return to a rear position relative to the top cover 1.

Figures 4, 5:
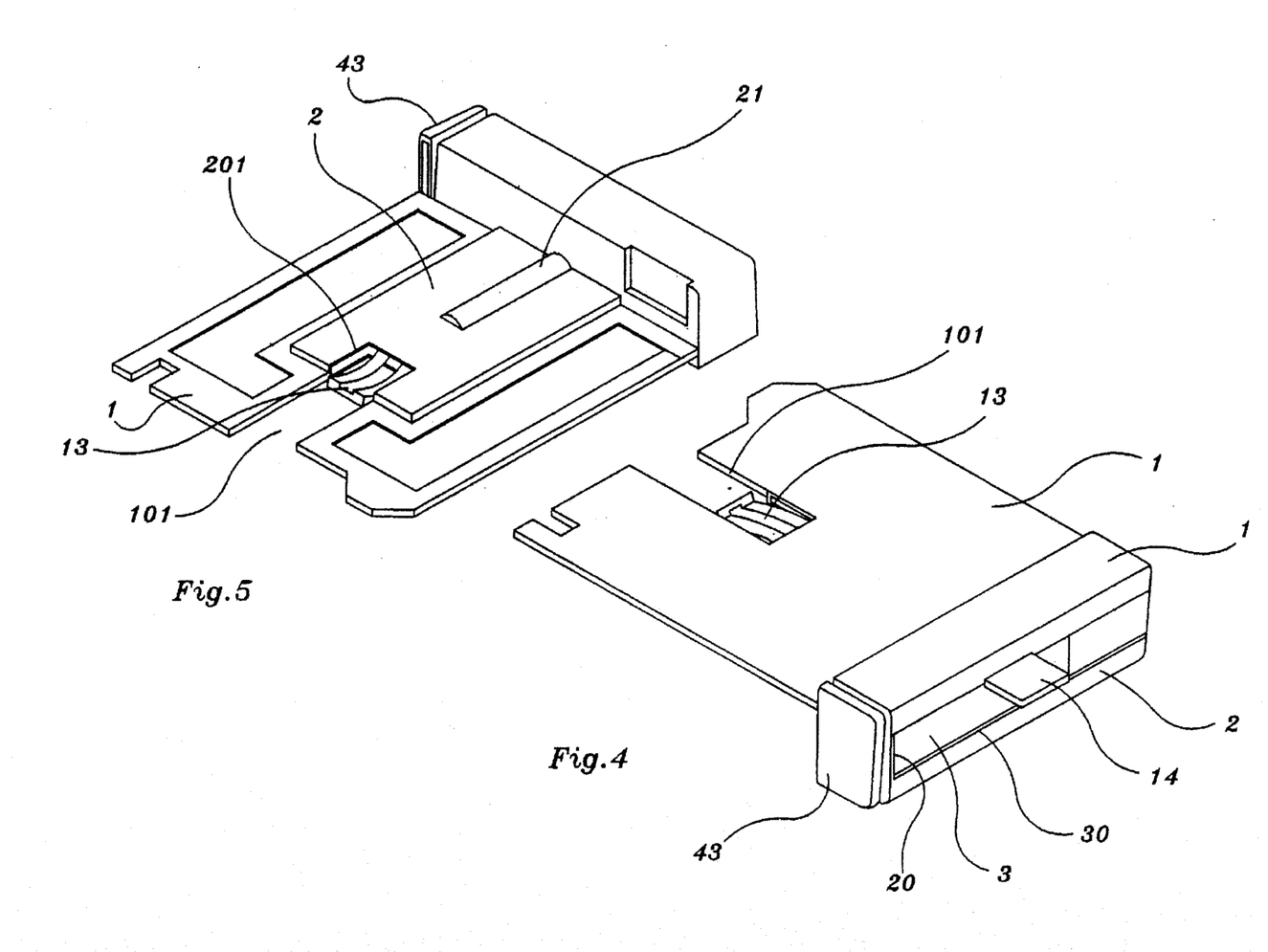
FIG. 4 is an assembled perspective of the lock for diskette drive according to the present invention.
FIG. 5 is also an assembled perspective of the present invention but with the bottom cover facing upward.

The bottom cover 2 is a substantially T-shaped member for connecting to a lower side of the top cover 1, as shown in FIG. 4. At a rear end of the bottom cover 2 opposite to the front central notch 201, that is, at the transverse portion of the bottom cover 2, there is a recess 20 having only three sidewalls with a backwark opening. The recess 20 is provided at inner surfaces of two lateral sidewalls with a bar 23 each for locating a lock body 3 thereat. A slot 22 is formed at one outer sidewall of the recess 20 so that a movable member 4 can laterally move in a course defined by the slot 22.

Figures 2, 2A:
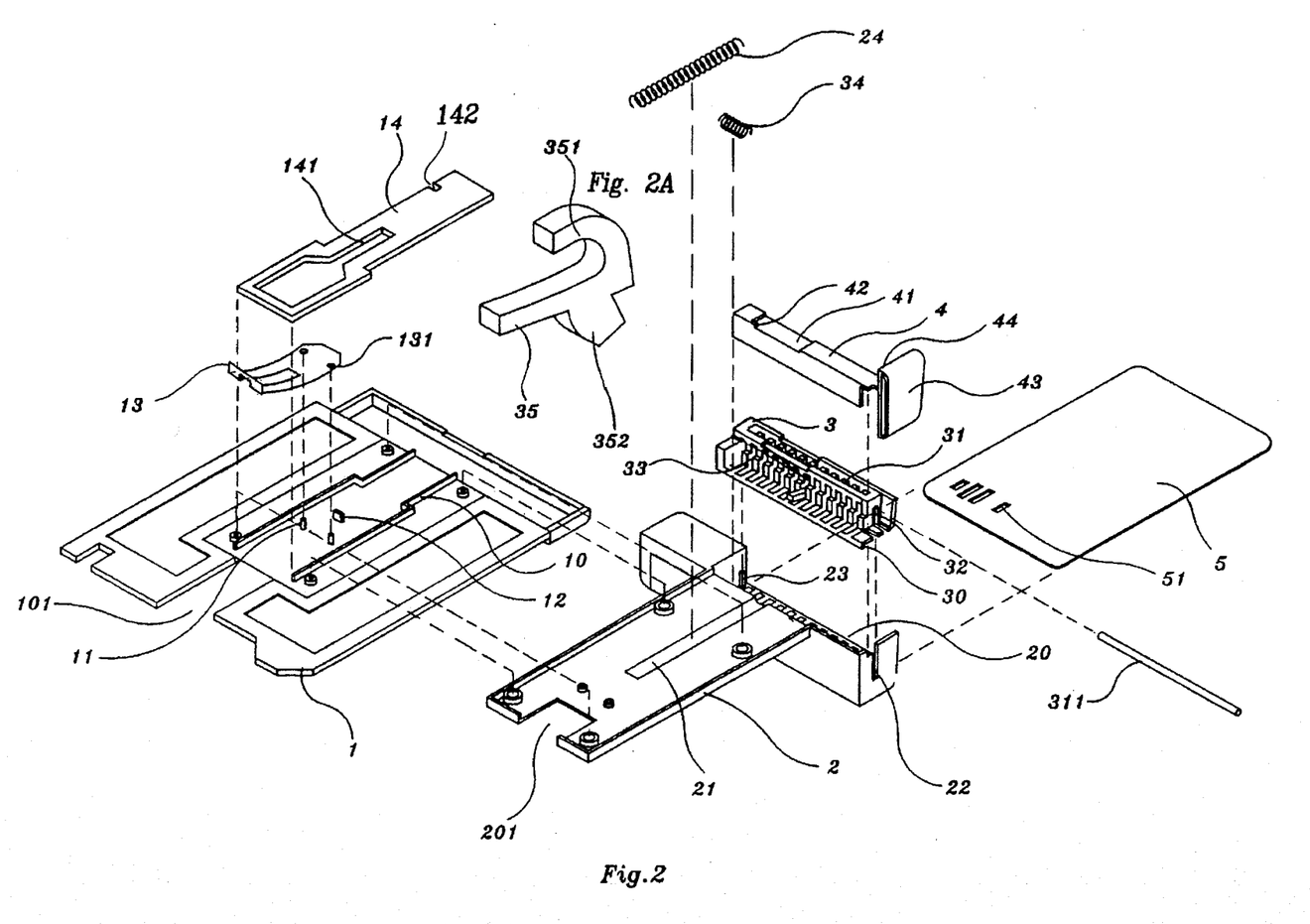
FIGS. 2 and 2A comprise an exploded perspective view of a lock for diskette drive according to the present invention.

The lock body 3 is received in the recess 20 of the bottom cover 2. The lock body 3 includes a U-shaped seat 31 at an upper portion thereof. A reverse U-shaped through hole 32 extends the length of the U-shaped seat 31 at a lower portion thereof, such that a spindle 311 can be extended through the through hole 32 for a plurality of lock pins 35 to hang thereon side by side. The lock pin 35 each includes a hook portion 351 and a lug portion 352. The lock pin 35 is hung on the spindle 311 by hooking its hook portion 351 on the spindle 311, such that a front end of the lock pin 35 can freely move up or down about the spindle 311. A series of through holes 33 are spaced in parallel along the lock body 3, such that the front ends of the lock pins 35 and the lug portions 352 thereof are separately supported on and project forward from the through holes 33. The through hole 32 forms two long openings on two lateral ends of the lock body 3 to just engage with the two bars 23 of the recess 20 of the bottom cover 2, so that the lock body 3 is fixed in the recess 20. A card slot 30 is provided to a lower portion of the lock body 3 for a key card 5 to insert thereinto. The key card 5 is formed with through holes 51 to engage with the lug portions 352 of the lock pins 35. The spindle 311 is fixed in place by inserting it into a space defined by the U-shaped seat and the reverse U-shaped through hole 32 extending through the lower portion of the former.

Figure 3:
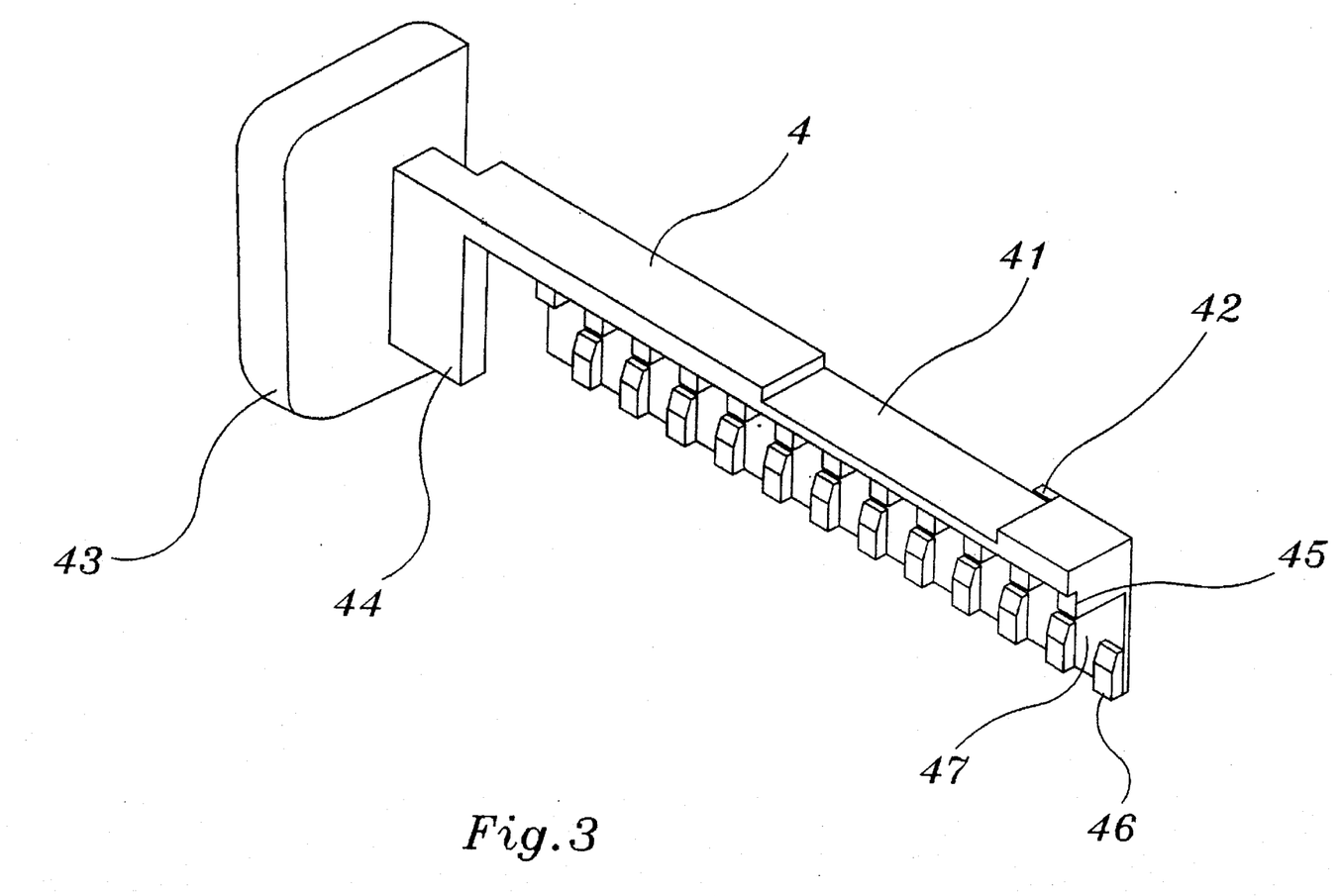
FIG. 3 is a perspective of the movable member of the present invention viewing from another side thereof.

The movable member 4 has a slightly sunk portion 41 formed near an inner end thereof for supporting a rear portion of the push plate 14 and allowing the same to move inward or outward over there, a projection 42 formed at one inner corner of the sunk portion 41 for detachably engaging with the dent 142 on the push plate 14, a push button 43 connected to an outer end of the movable member 4 opposite to the sunk portion 41, a guide portion 44 for engaging into the slot 22 formed on one outer sidewall of the recess 20 to limit the travel of the movable member 4, a plurality of parallely arranged upper teeth 45 and lower teeth 46 pairs formed at a lower rear part of the movable member 4 below the sunk portion 41, and a horizontally extended sliding groove 47 formed between the upper teeth 45 and the lower teeth 46 for receiving the forward projected front end of the lock pins 35 when the key card 5 is inserted into the card slot. To enable the movable member 4 to normally return to an laterally outward position, a second compression spring 34 is disposed between the inner end of the movable member 4 opposite to the push button 43 and an inner end surface of the recess 20 of the bottom cover 2 abutting against the inner end of the movable member 4, so that the movable member 4 is always laterally sprung outward.

It is very easy to assemble the lock for diskette drive according to the present invention. When assembled, as shown in FIGS. 4 and 5, the springy plate 13 forward projects into the front central notches 101, 201 of the top cover 1 and the bottom cover 2, respectively. The push plate 14 is located below the push plate 13. The first compression spring 24 always pushes the push plate 14 backward. The second compression spring 34 always pushes the movable member 4 laterally outward so that the projection 42 of the movable member shall extends into and firmly engage with the dent 142 of the push plate 14 when the latter passes by the projection 42. The movement of the movable member 4 depends on whether the front ends of the lock pins 35 projected from the through holes 33 of the lock body 3 are located in the sliding groove 47 between the upper and the lower teeth 45, 46 inside the movable member 4, and on whether the key card 5 is inserted into the card slot 30.

Figure 6:
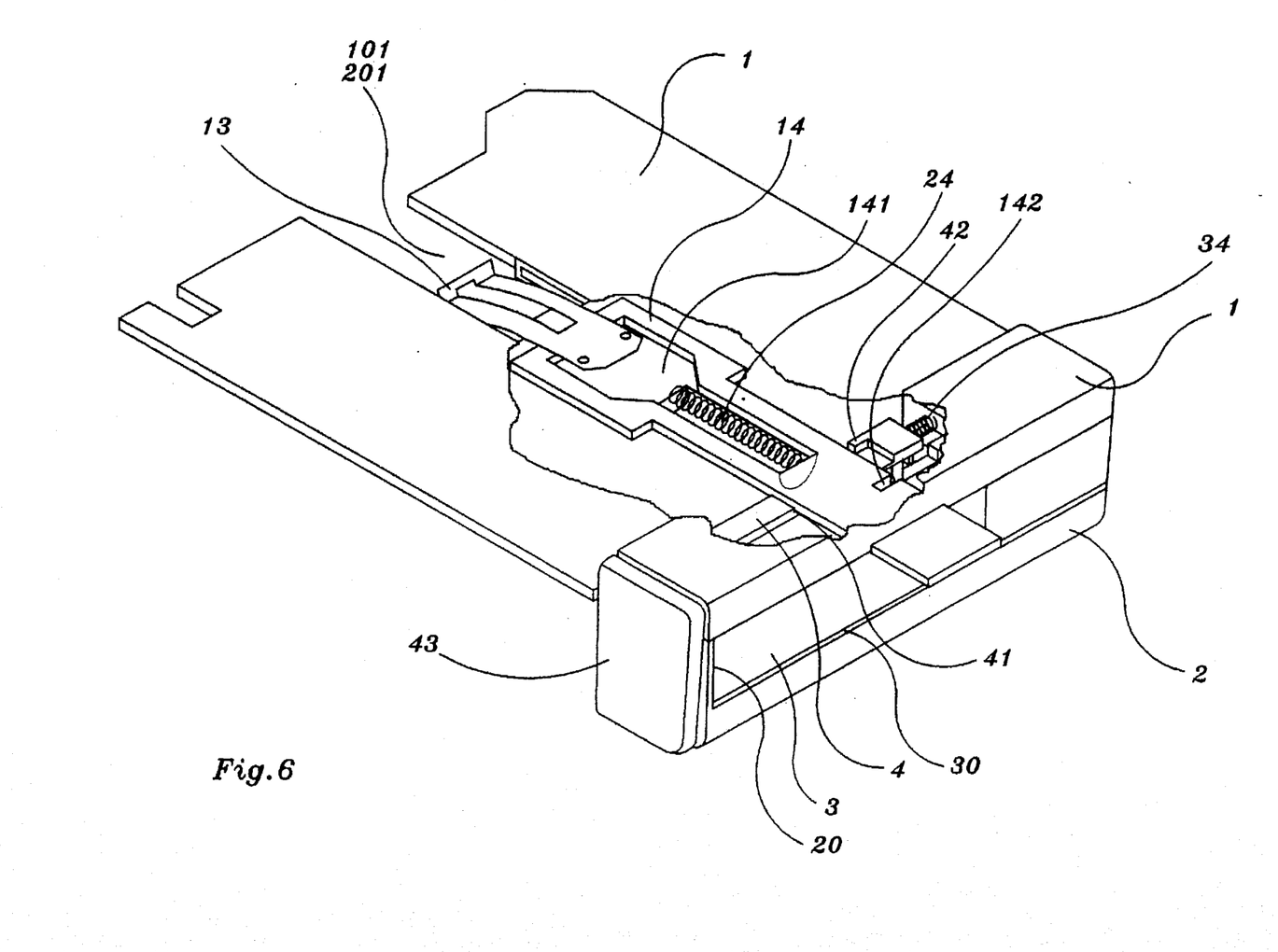
FIG. 6 is a perspective with a part thereof being cut away to better show the lock of the present invention in an unlocked state.

Please refer to FIG. 6 in which a lock according to the present invention in an unlocked state is shown. As shown, the push plate 14 is not pushed into the top and the bottom covers 1, 2 and the springy plate 13 is not lifted by the push plate 14. At this point, the projection 42 of the movable member 4 at one end of the sunk portion 41 (not shown) is not engaged into the dent 142 of the push plate 14 and is therefore not pushed laterally outward by the second compression spring 34.

Figure 7:
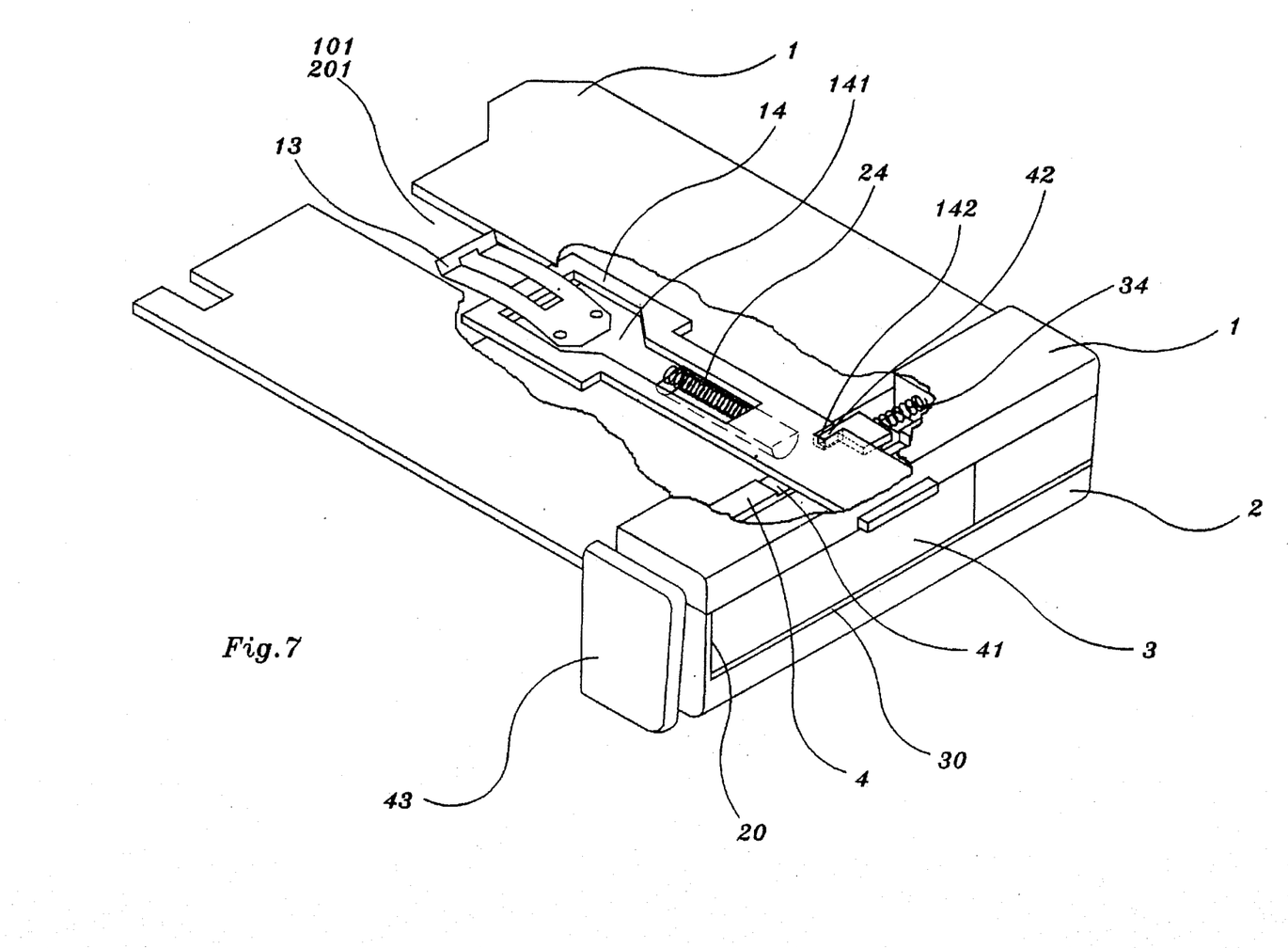
FIG. 7 is a perspective similar to that in FIG. 6 but with the lock of the present invention in a locked state.

In FIG. 7, the lock of the present invention in a locked state is shown. The push plate 14 is pushed into the top and the bottom covers 1, 2 to lift the front hook portion of the springy plate 13. Meanwhile, when the dent 142 passes by the projection 42 of the movable member 4, the second compression spring 34 immediately pushes the movable member 4 laterally outward and causes the projection 42 to extend into and engage with the dent 142, locking the push plate 14 in a forward inserted position.

Figure 8:
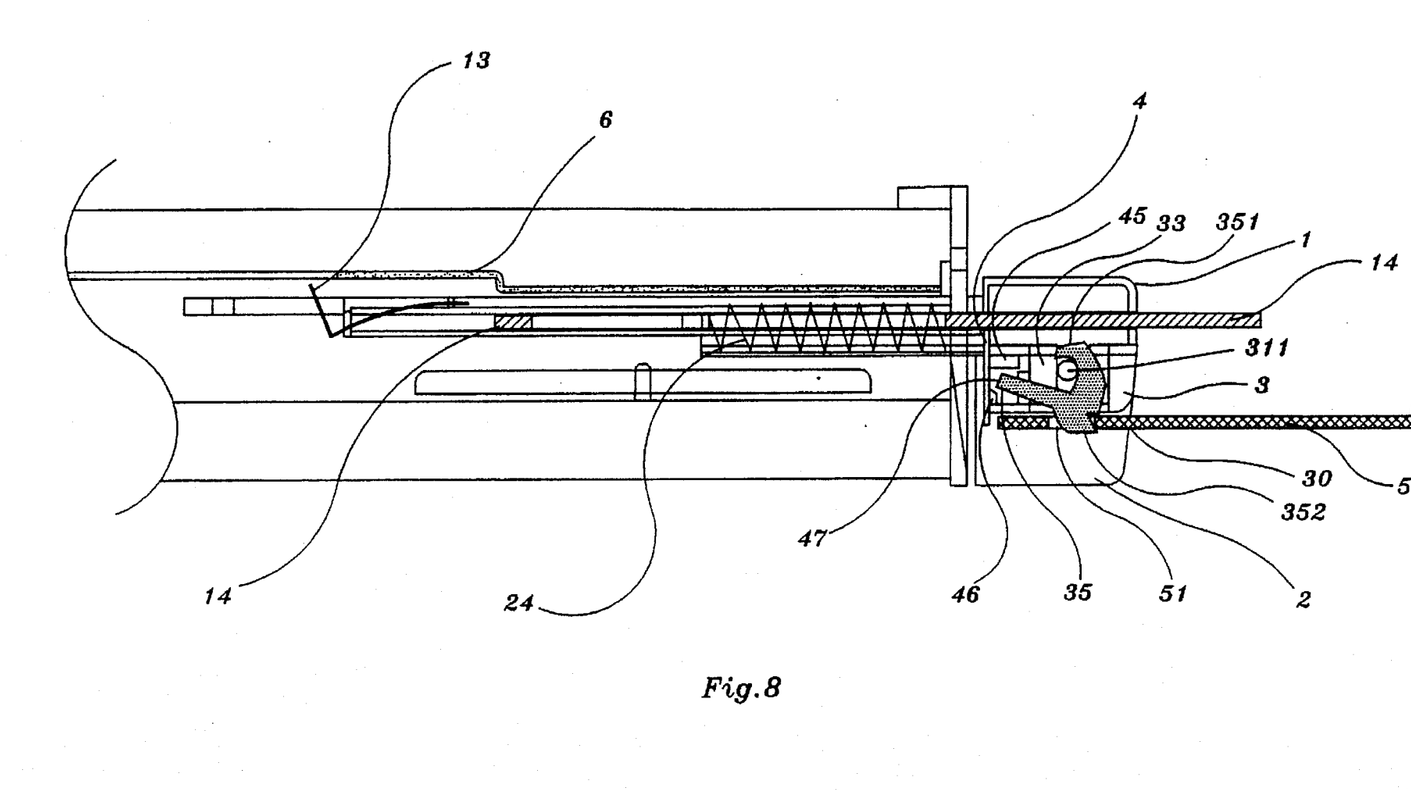
FIG. 8 is a fragmentary, sectional side view of the present invention showing the lock in an unlocked state.
Figure 9:
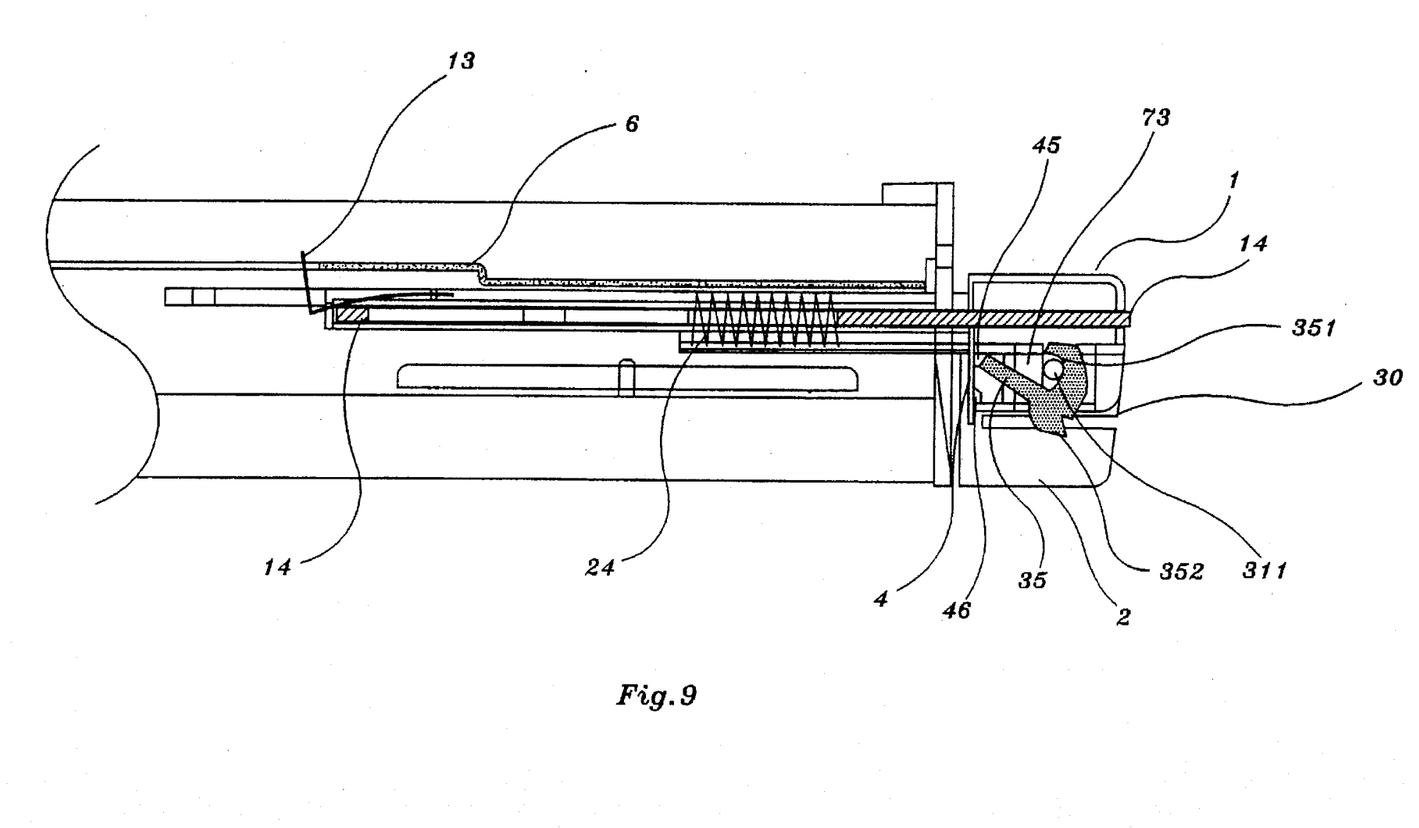
FIG. 9 is a view similar to that in FIG. 8 but with the lock in a locked state.

Please now refer to FIGS. 8 and 9 for the operation of the lock of the present invention. When the lock is inserted into the diskette drive 6 while it is in the unlocked state, the push plate 14 is not pushed inward and the springy plate 13 is not lifted to contact with an inner edge of a disk slot of the diskette drive 6. When the key card 5 is inserted into the card slot 30, it brings the front end portions of the lock pins 35 to project out of the holes 33 and locate in the sliding groove 47 on the movable member 4. To lock the disette drive 6, push the push plate 14 inward to force the front hook end of the springy plate 13 to lift while the dent 142 engages with the projection 42 of the movable member 4. The engagement of the projection 42 into the dent 142 causes the movable member 4 to shift leftward relative to the bottom cover 2 due to the spring force of the second compression spring. 34. Since the lock pins 35 are freely hung on the spindle 311 by hooking the hook portion 351 thereof to the spindle 311, the insertion of the key card 5 shall push the lug portions 352 and causes the front ends of the lock pins 35 to locate in the sliding groove 47 of the movable member 4, the movable member 4 with the engagement of the projection 42 into the dent 142 is allowed to be shifted leftward by the second compression spring 34. At this point, the key card 5 is pulled out of the card slot 30 so that the lug portions 352 are no longer limited by the through holes 51 on the key card 5. At this point, the lug portions 352 shall be released to locate in grooves at two sides of the upper teeth 45 or the lower teeths 46 and the movable member 4 is prevented from moving rightward.

To unlock the diskette drive 6, first insert the key card 5 into the card slot 30 so that the lug portions 352 of the lock pins 35 just fall into the through holes 51 on the key card 5 and the front end of the lock pins 35 locate in the sliding groove 47 again. Then, the push button 43 of the movable member 4 is depressed to disengage the projection 42 from the dent 142 on the push plate 14, as shown in FIG. 6. At this point, the first compression spring 24 shall immediately push the push plate 14 backward, allowing the front hook portion of the springy plate 13 to lower down and no longer contacts with the inner edge of the disk slot of the diskette drive 6. Thereby, the whole lock for diskette drive can be pulled out of the drive 6. The operation is easy and convenient.

What is claimed is:

1. A lock for diskette drive suitable for inserting into and locking up a disk slot of said diskette drive to prevent any unauthorized data reading, writing, and copying, comprising:

a top and a bottom cover detachably connected together to form a flat front part of said lock for inserting into said disk slot of said diskette drive; said top cover being formed at a front central portion with a first notch and said bottom cover being formed at a front central portion with a second notch corresponding to said first notch, said top cover being provided on an inner surface with a pair of guide rails behind two sides of said first notch, two fixing pins located within said pair of rails near said first notch, and a boss centered on said inner surface of said top cover; said bottom cover being a T-shaped member and having a recess formed at a transverse portion thereof, said recess being provided at inner surfaces of two lateral sidewalls with a bar each, and at one outer sidewall with a slot, said bottom cover further having a longitudinally extended central channel formed on a longitudinal portion thereof;

a springy plate disposed between said top and said bottom covers, said springy plate having a liftable front hook portion and two through holes formed near a rear portion thereof for engaging with said two fixing pins of said top cover so that said springy plate is fixedly connected to said top cover;

a push plate also disposed between said top and said bottom cover below said springy plate and within said pair of guide rails on said top cover, said push plate being formed at a front portion with an opening and at a rear portion at one side with a dent, said opening having an expanded front part for said two fixing pins on said top cover to project upward therefrom and a narrowed rear part corresponding to said central channel of said bottom cover for receiving a first compression spring therein, said first compression spring having one end thereof pressed against said boss on said top cover and another end against an end wall of said narrowed portion of said opening on said push plate;

a lock body disposed in said recess of said bottom cover, said lock body having a U-shaped seat at an upper portion thereof and a reverse U-shaped long through hole extended the length of said U-shaped seat at a lower portion thereof for a spindle to extend therethrough; a plurality, spaced in parallel, of lock pins each having a hook portion and a lug portion being hung on said spindle by hooking their hook portions on said spindle, such that a front end of each said lock pin freely move up or down about said spindle; said lock body being further formed with a series of parallel through holes, such that said front ends of said lock pins and said lug portions thereof are separately hung on and project forward from said parallel through holes, said long through hole forming two long openings on two end walls of said lock body to engage with said two bars on said recess, such that said lock body is firmly positioned in said recess, and a card slot being provided to a lower portion of said lock body;

a movable member disposed between said recess and said lock body to cover a top portion of said lock body, said movable member having a sunk portion formed near an inner end thereof for supporting the rear portion of said push plate and allowing the same to move inward or outward over there, a projection formed at one inner corner of said sunk portion for detachably engaging with said dent on said push plate, a push button connected to an outer end of said movable member opposite to said sunk portion, a guide portion for engaging into said slot formed on one outer sidewall of said recess to limit a travel of said movable member, a plurality of parallely arranged upper teeth and lower teeth pairs formed at a lower rear part of said movable member below said sunk portion, a sliding groove formed between said upper teeth and said lower teeth for receiving said forward projected front end of said lock pins, and a second compression spring disposed between said recess and an end of said movable member near said sunk portion; and a key card formed with a plurality of specially arranged through holes corresponding to said lug portions of said lock pins on said lock body;

whereby, by inserting said lock for diskette drive into said disk slot of said diskette drive, inserting said key card into said card slot of said lock body to cause said front end portions of said lock pins to locate in said sliding groove on said movable member, pushing said push plate inward between said top and said bottom covers until said dent near said rear portion of said push plate engages with said projection of said movable member with said front hook portion of said springy plate being lifted to contact with an inner edge of said disk slot of said diskette drive and be retained thereto, and pulling said key card out of said card slot again, said card slot of said diskette drive is locked by said lock; and by inserting said key card into said card slot of said lock body, and by depressing said push button of said movable member to disengage said projection from said dent on said push plate and allow said first compression spring to push said push plate backward, said front hook portion of said springy plate lowers down to disengage from said inner edge of said disk slot of said diskette drive and thereby unlock the latter.

* * * * *